(12) United States Patent
Bates et al.

(10) Patent No.: US 8,006,182 B2
(45) Date of Patent: Aug. 23, 2011

(54) METHOD AND COMPUTER PROGRAM PRODUCT FOR IMPLEMENTING AUTOMATIC AVATAR STATUS INDICATORS

(75) Inventors: Cary Lee Bates, Rochester, MN (US); Zachary A. Garbow, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 725 days.

(21) Appl. No.: 12/050,312

(22) Filed: Mar. 18, 2008

(65) Prior Publication Data

US 2009/0241049 A1    Sep. 24, 2009

(51) Int. Cl.
*G06F 3/048* (2006.01)
(52) U.S. Cl. ......... 715/706; 715/709; 715/713; 715/771
(58) Field of Classification Search .......... 715/704–713, 715/771
See application file for complete search history.

(56) References Cited

U.S. PATENT DOCUMENTS

| | | | |
|---|---|---|---|
| 6,519,639 B1* | 2/2003 | Glasser et al. | 709/224 |
| 2005/0169446 A1* | 8/2005 | Randall et al. | 379/93.23 |
| 2007/0112624 A1* | 5/2007 | Jung et al. | 705/14 |
| 2007/0184855 A1* | 8/2007 | Klassen et al. | 455/457 |
| 2008/0030496 A1* | 2/2008 | Lee et al. | 345/418 |
| 2008/0201638 A1* | 8/2008 | Nair | 715/706 |
| 2008/0207329 A1* | 8/2008 | Wallace et al. | 463/42 |
| 2008/0214253 A1* | 9/2008 | Gillo et al. | 463/1 |
| 2008/0235581 A1* | 9/2008 | Caporale et al. | 715/706 |
| 2008/0235582 A1* | 9/2008 | Zalewski et al. | 715/716 |
| 2009/0063983 A1* | 3/2009 | Amidon et al. | 715/733 |
| 2009/0085934 A1* | 4/2009 | Baier et al. | 345/660 |
| 2009/0089709 A1* | 4/2009 | Baier et al. | 715/817 |
| 2009/0106672 A1* | 4/2009 | Burstrom | 715/757 |
| 2009/0177976 A1* | 7/2009 | Bokor et al. | 715/753 |

* cited by examiner

*Primary Examiner* — Tadeese Hailu
(74) *Attorney, Agent, or Firm* — Cantor Colburn LLP

(57) ABSTRACT

The exemplary embodiment of the present invention provides a means for the simulating of real world activities within a virtual environment. Information retrieved from locally executing applications (e.g., such as a screen saver, voice over IP phone system, etc.) or sensor information is utilized to deliver messages from a client application to the virtual environment in order to put an avatar in a state that visually indicates that a system user is busy.

2 Claims, 2 Drawing Sheets

METHOD AND COMPUTER PROGRAM PRODUCT FOR IMPLEMENTING AUTOMATIC AVATAR STATUS INDICATORS

FIELD OF THE INVENTION

This invention relates to avatar placement within a virtual world environment, and particularly using an avatar to simulate a real world activity in a virtual world environment.

DESCRIPTION OF BACKGROUND

Virtual worlds are computer based simulated environments wherein environment system users inhabit a virtual environment and interact with other system users by the use of user graphical avatars that are representative of the user. Typically, computer simulated virtual environments are created to be similar to real-world environments. The virtual environments also can be created to abide by the rules of the real world in regard to physical laws, real-time communication between parties, etc. Today users interacting within virtual worlds often encounter real world distractions that draw their attention away from their virtual environments (e.g., such as phones ringing, visitors at their front door, etc.). However, while the attention of the virtual world user is directed elsewhere the avatar of the user within the virtual world will appear to be fully aware, but yet unresponsive to other interacting avatars. Within a virtual environment an unresponsive avatar could socially pose problems to those individuals who may try to interact with the unresponsive avatar; actions that may further make the person that is associated with the avatar appear to be challenged as far as having mastered avatar control or inattentive. More importantly, the display of an idle unresponsive avatar detracts from the pseudo-realism that makes virtual worlds a compelling place to interact with others.

One way this problem can be handled is to have an environment recognize that a user is away (e.g., similar to standby techniques utilized within instant messaging) and have the avatar reflect a sleeping state. However, this still does not provide any semblance of realistic qualities. A user's avatar that is talking to someone one minute, and is sleeping on a virtual street the next minute provides for a clunky and not-very-lifelike virtual experience.

SUMMARY OF THE INVENTION

The shortcomings of the prior art are overcome and additional advantages are provided through the provision of a method for the configuration and display of a status-indicating avatar. The method comprises receiving user activity input information at a virtual world (VM) interface component comprised within a client VW application, wherein the user activity input information can comprises information received singularly or in combination from at least one locally executing application or at least one input sensor and determining a user activity that is associated with the user activity input information, the user activity being based upon hierarchical activity characteristics as specified by a user and activity characteristics that are based upon community protocols that are implemented at a target VW application.

The method also comprises mapping the determined user activity to an activity that is associated with the target VW application and transmitting a command to the target VW application in order to display an avatar in accordance with the mapped to VW activity. The mapping of a determined activity to a target VW application activity comprises determining the origin of the received activity input information, prioritizing a set of response actions based upon a comparison of the activity input information to the activity characteristics that are based upon the target VW applications community protocols, retrieving current avatar environment information, and determining a best correlation between the user activity input information and a VW avatar activity information listing.

Computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
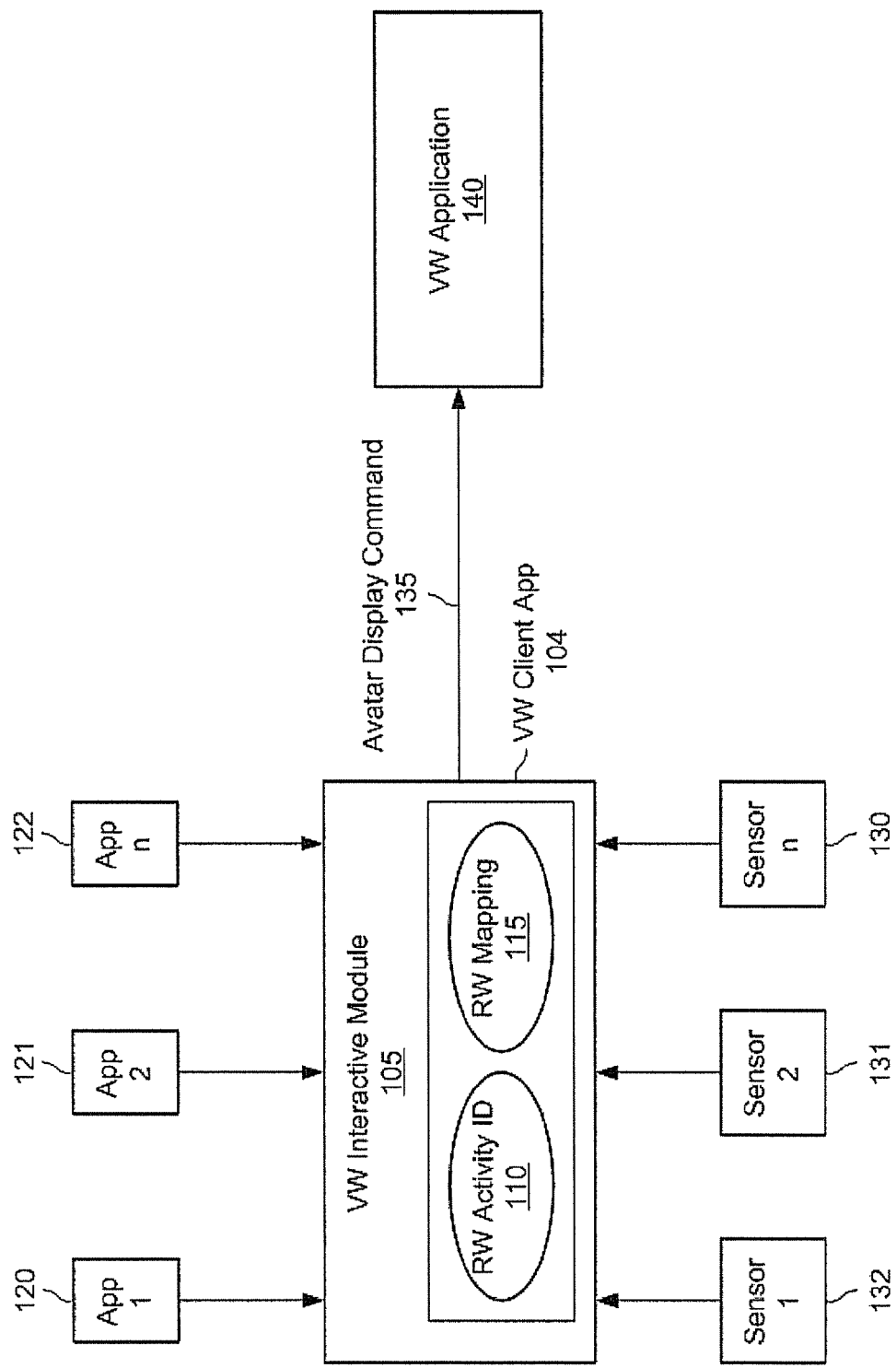
FIG. 1 illustrates one example of a system for configuring an avatar to display a real world activity in accordance with the exemplary embodiment of the present invention.

The detailed description explains the preferred embodiments of the invention, together with advantages and features, by way of example with reference to the drawings.

DETAILED DESCRIPTION OF THE INVENTION

An exemplary embodiment of the invention is described below in detail. The disclosed embodiment is intended to be illustrative only since numerous modifications and variations therein will be apparent to those of ordinary skill in the art.

Aspects of the exemplary embodiment of the present invention can be implemented within a conventional computing system environment comprising hardware and software elements (not shown). Specifically, the methodologies of the present invention can be implemented to program a conventional computer system in order to accomplish the prescribed tasks of the present invention as described below. The software elements of the programmed computer are envisioned for purposes of clarity as executable in a main memory of a computing system, but as persons skilled in the art will understand, they may not in actuality reside simultaneously or in their entireties in memory.

The exemplary embodiment of the present invention comprises a solution that provides a virtual environment user the ability to select a hierarchical avatar action which best portrays a message the users want to visually convey to other virtual environment users upon the occurrence of a given event. A user is also provided with the capability to enact the automatic prioritization of response actions that enable a system user to choose and display the best response to a real world activity that is based on whether a desired response action is available or even possible to be performed within a virtual world environment. Further provided is a mapping of response actions to the locations that are related to an avatars location within a virtual environment.

Currently, instant-messaging systems can be configured to display a status indicator in order to notify other instant messaging system users that a user is away. Typically the use of a predetermined status indicator is displayed to system users to indicate the user is away (e.g., a phone icon being displayed shows that a user is currently away on a telephone call). Instant messaging users can set their away messages to specific activities, however, within in a 3D virtual world it is important to create a realistic visual representation of an environments user's operational status rather than just displaying a simple text field or an icon to other system users. Thus, in a virtual world, if a user becomes distracted by another task, then the user may want to visually display, via their avatar, that they are currently involved in another activity; and in some instances indicate the nature of the activity that has taken the user's attention away from the virtual environment.

For example, in the instance that a user starts interacting with another application on their computer rather than within the virtual world, the user may configure their avatar to sit down with a laptop or sit down and read a book. Within the exemplary embodiment a virtual world activity representation does not necessarily need to match the specific real world action being taken—but rather the virtual world activity representation should convey the nature of an activity in which a user is engaged. Further, if a certain real world activity is not available to be represented within a virtual world activity, then the next best representative response action can be chosen by a user and displayed via their avatar within the virtual environment. For example, in the 3D virtual world if a default activity action is to have the avatar of a user sit down and read a book and there is no object within the environment to sit on then the next best action may be to have the avatar lean on an object and read. If there is no object to lean on, then the user may have some other action that they want the avatar to perform in order to indicate the user is busy.

In another example, while reading a book in a coffee shop serves as a good visual indication that a user is currently busy, in the instance that the user is at a virtual football game it is unlikely and unrealistic that they would pull out a book if in the instance that the user is busy with another activity. A better activity to represent a short away status for the user would be to display the user's avatar taking a trip to a stadium's restroom or glancing through a team program.

As mentioned above, within the exemplary embodiment of the present invention real world activities can be closely simulated within a virtual environment. This aspect is accomplished by the use of real world situational information that is delivered from applications (e.g., screen saver applications, VoIP applications, etc.) to the virtual environment in order to provide information that assists in putting a user's avatar in a state that visually displays to the virtual world that the user is currently engaged in another activity. Therefore, a user does not have to take explicit steps to engage the real world representative avatar action in the event that the user is hastily called away to another activity.

Figure 2:
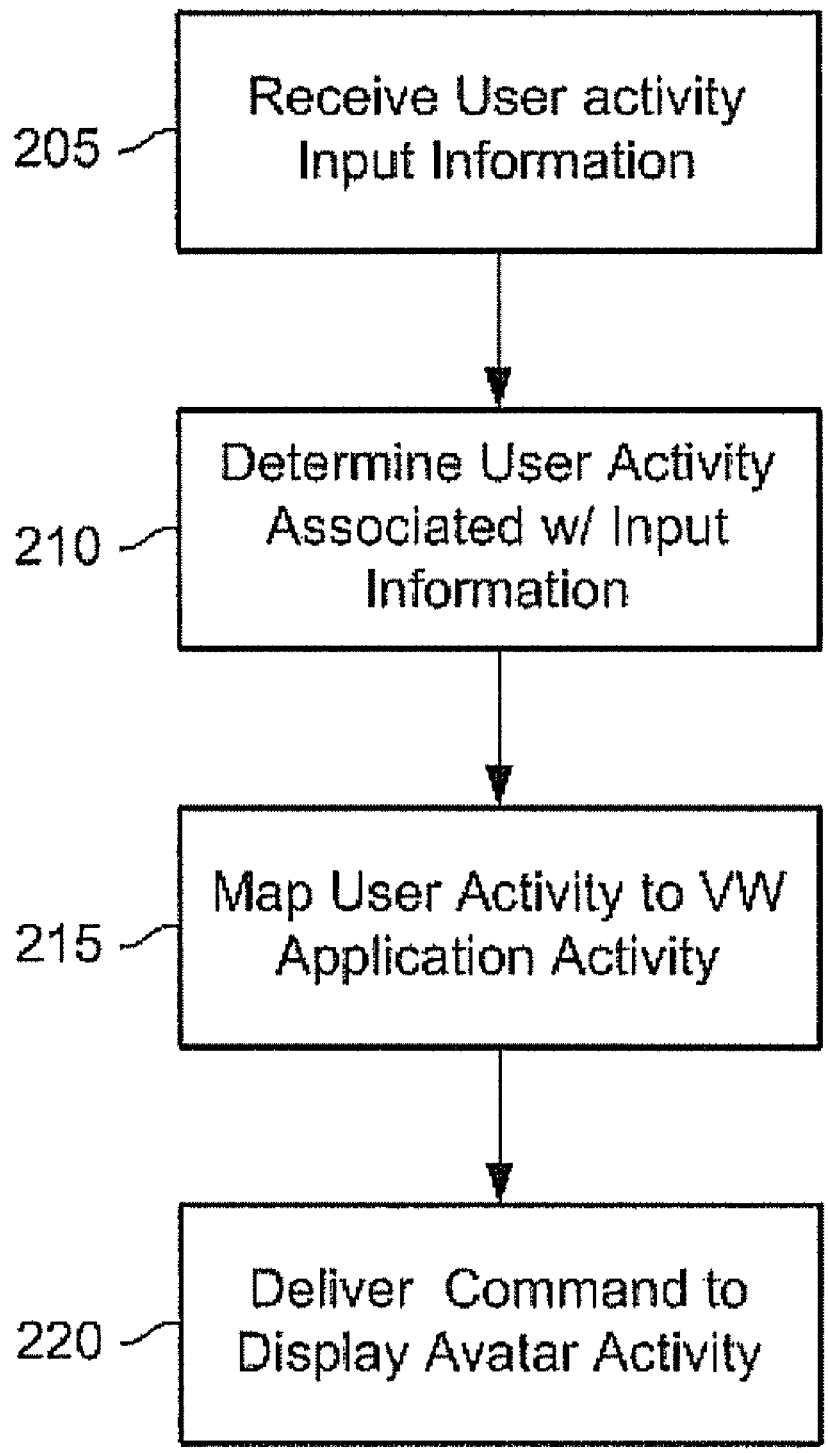
FIG. 2 illustrates one example of a method for simulating a real world activity with an avatar in accordance with the exemplary embodiment of the present invention.

The exemplary embodiment of the present invention accomplishes these results via the implementation of a virtual world client application 104 that comprises a software virtual world interface module 105. The virtual world interface module 105 comprises a real world activity identification component 110 and a real world activity mapping component 115; the real world activity mapping component 115 being configured to map real world activities to a best suited virtual world activity (FIG. 1). The virtual world interface module gathers events from locally executing applications/driver programs (120, 121, 122) within a user's computing system (step 205, FIG. 2). Depending on the information gathered from an application and the particular event generated at the application (120, 121, 122), the state of a user's avatar is adjusted to best reflect the realities of the user's real world situation.

For instance, when a user's screen saver application (120, 121, or 122) is activated at their computer—indicating that the user is not currently interacting with their computing system—an event is then sent to the virtual world interface module 105. The delivered event reports that the activation of the screen saver application to the virtual world interface module 105. In response to the received event the virtual world interface 105 determines that the event came from the screen saver application (120, 121, or 122) and that the event was an active screen saver event (step 210). Thereafter, the virtual world interface module 105 maps the screen saver active event to a specified displayed response action (step 215) and delivers the avatar display command 135 to a remotely executing virtual application 140 (step 220) to configure the user's avatar to display the selected real world response action. For example, in response to the activation of the screen saver, some users may select their response action to have the displayed avatar walk out of a current location and disappear, another user may want their avatar to go to a virtual home, while another user may elect to have their avatar sit down and appear to be asleep.

Within the exemplary embodiment of the present invention the virtual world interface module 105 via the real world activity identification component 110 can automatically identify the real world activity in which a user is engaged. As mentioned above, this is accomplished by the virtual world interface module 105 receiving and recognizing input from an application (120, 121, or 122) and then using the retrieved application (120, 121, 122) information to map to received events and thereafter determine activities to be performed by the avatar according to the user's predetermined system configuration. For example, when a user answers a cell phone or VoIP call, a driver program executing at the user's computing system—for example, software added to a user's computer system that would use a computer's Bluetooth network capabilities to determine that Bluetooth signals are sent to and from a user's head set, thus implying the user is on a cell phone call—detects this call event and sends the information in regard to the call event to the virtual world application 140 via the virtual world interface module 105 in order to configure the user's avatar to indicate the user is on a phone call.

Default actions can be conditional based upon whether in the virtual world the user's avatar is within or who else is present in the virtual location. These rules could govern which action is taken when a particular event is received. These rules are implemented in the activities list stored at the virtual world application 140—the ordered list of rules that are to be applied until a response activity rule is found that works. There is an activities list associated with each event that is undersold within a virtual world environment. The simplest rule form includes a condition followed by an action to take should the condition be true. For example:

BATHROOM.NEAREST.DISTANCE < 200 ft --> WalkTo BATHROOM.NEAREST AVATAR.WITH_DOG -> AVATAR.DOG.PIDDLE
LOCATION.IS_OUTDOORS AND OBJECTS_IN_VIEW.LARGEST != NIL -->
Walk Behind OBJECTS_IN_VIEW.LARGEST
TRUE --> Wet Pants Some locations may choose to substitute actions as well so that an appropriate action is performed for the location. For instance the user may have a rule mapped to an event like:

```
OBJECTS_IN_VIEW.CHAR.NEAREST.DISTANCE < 20 ft -->
WalkTo
OBJECTS_IN_VIEW.CHAR.NEAREST;
SitOn OBJECTS_IN_VIEW.CHAR.NEAREST
```

If the above specified location happens to be an area used for yoga the entire floor may be considered a chair so the normal act of sitting down may be to sit on the floor. In this instance the rule OBJECTS_IN_VIEW.CHAR.NEAREST.DISTANCE would always answer zero. The action WalkTo would do nothing because you are already there, and the action SitOn would cause the avatar to sit on the displayed floor.

Response activity categories may be hierarchically mapped to virtual world locations. For instance, in a public area, a default representation of the condition "Short Break" of a type "non-responsive," may be to have an avatar walk to the nearest restroom. On the other hand, a representation of the condition "Short Break" of type "responsive" may cause the avatar to seemingly talk on his/her virtual cell phone, or to read a magazine depending upon the responses comprised within the activities listing at the virtual world mapping application 140.

Within the exemplary embodiment the virtual world interface module 105 is configured to receive and recognize input from an application (120, 121, or 122) and sensors (130, 131, 132) (e.g., a motion sensor enabled to monitor a specified area in proximity to the users computing system or optical and motion sensors that are configured to operate in accordance with a networked security monitoring system) and then use the retrieved information to map to events and thereafter determine activities to be performed by the avatar according to a predetermined configuration. In operation, a driver program could allow a user to specify that in the instance that a screen saver application is executed and a positive indication for motion is registered in a sensor within the user's house that is directed at the area of the user's bathroom, then the driver program will deliver a bathroom-indicating event to the virtual world interface module 105. The virtual world interface module 105 would then refer to a mapping list for what activities that are to be performed in the instance that a bathroom event is received. As a result of receiving the event that the virtual world interface module 105 delivers directions to the virtual world application 140 to send the user's avatar to the nearest virtual restroom if a restroom is within an given distance of the avatar. If this action is not possible, then the next action in the activities list may be performed (e.g., which could be for the avatar to travel behind a large object). If the detectors (130, 131, 132) sense no motion at the time the screen saver is activated, then the driver may send a gone away event to the virtual world interface module 105. The virtual world interface module 105 would map the gone away event to the first action in the activities list that is associated with the event—this action may comprise the avatar walking out of the displayed virtual worldview. If this avatar performance command cannot be performed, then the next item in the activities list for a gone away event will be performed.

Within the exemplary embodiment two activity response-mapping features are provided. The first activity response feature as specified above is featured in association with the virtual world client application 104, wherein the rules that dictate which the response to real world activities specify the events that are sent to the virtual world application 140. The second activity response feature is comprised within the virtual world application 140, wherein each event at the virtual world application 140 has an activities list where attributes of the virtual world can be tested in order to select the best activity for the event. Further, the user can manually set the real world activity component 110 in the absence of an automatic trigger. For instance, the user may be leaving the computer to change his/her baby's diapers and manually indicates "Activity→Short Break→Non-responsive" as the status.

The real world activity of a user is matched to a best-suited virtual world application 140 activity based on the criteria contained within an activity profile. An activity profile exists partly on the virtual world client application 104 to map driver events to events understood by the virtual world application 140 and an event action list comprised within the virtual world environment that directs the actions of a user's avatars when an event is received. For example, if the virtual world interface module 105 is sent an event from a phone system, the event sent from the phone system is mapped to a call-initiated event at the real world mapping component 115. An ordered activities lists is retrieved for the call-initiated event. A first response activity rule specify having the displayed avatar answering a virtual cell phone, and if the avatar has their cell phone with them, this action can be performed as the user would answer their own cell phone—and further have the avatar put the cell phone away when a call terminated event is received. If the user's avatar did not have a virtual cell phone, then the next action in the action list will be considered.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for the configuration and display of a status indicating avatar, the method comprising:
   receiving user activity input information at a virtual world (VW) interface component comprised within a client VW application, wherein the user activity input information comprises information received singularly or in combination from at least one locally executing application or at least one input sensor the user activity input information indicative of user activity in the real world;

determining a user activity that is associated with the user activity input information, the user activity being based upon hierarchical activity characteristics as specified by a user and activity characteristics that are based upon community protocols that are implemented at a target VW application;

mapping the determined user activity to an activity that is associated with the target VW application, wherein mapping the determined activity to a target VW application activity comprises:

determining the origin of the received activity input information;

prioritizing a set of response actions based upon a comparison of the activity input information to the activity characteristics that are based upon the target VW applications community protocols;

retrieving current avatar environment information, the current avatar environment information including attributes of the VW associated with the avatar;

determining between the user activity input information and a best available correlation activity chosen from a VW avatar activity information listing; and transmitting a command to the target VW application in order to display an avatar in accordance with the mapped to VW activity.

2. A computer program product that includes a non-transitory computer readable medium useable by a processor, the medium having stored thereon a sequence of instructions which, when executed by the processor, causes the processor to deliver a command for the configuration and display of a status indicating avatar from a client application to a target application, by:

receiving user activity input information at a virtual world (VW) interface component comprised within a client VW application, wherein the user activity input information comprises information received singularly or in combination from at least one locally executing application or at least one input sensor the user activity input information indicative of user activity in the real world;

determining a user activity that is associated with the user activity input information, the user activity being based upon hierarchical activity characteristics as specified by a user and activity characteristics that are based upon community protocols that are implemented at a target VW application;

mapping the determined user activity to an activity that is associated with the target VW application, wherein mapping the determined activity to a target VW application activity comprises:

determining the origin of the received activity input information;

prioritizing a set of response actions based upon a comparison of the activity input information to the activity characteristics that are based upon the target VW applications community protocols;

retrieving current avatar environment information, the current avatar environment information including attributes of the VW associated with the avatar;

determining between the user activity input information and a best available correlation activity chosen from a VW avatar activity information listing; and transmitting a command to the target VW application in order to display an avatar in accordance with the mapped to VW activity.

\* \* \* \* \*